(12) United States Patent
Zapf

(10) Patent No.: US 12,729,695 B2
(45) Date of Patent: Sep. 8, 2026

(54) HYDRAULIC PUMP

(71) Applicant: VALEO EMBRAYAGES, Amiens Cedex (FR)

(72) Inventor: Felix Zapf, Ebern (DE)

(73) Assignee: VALEO EMBRAYAGES, Amiens Cedex (FR)

(*) Notice: Subject to any disclaimer, the term of this patent is extended or adjusted under 35 U.S.C. 154(b) by 0 days.

(21) Appl. No.: 18/951,817

(22) Filed: Nov. 19, 2024

(65) Prior Publication Data

US 2025/0163917 A1 May 22, 2025

(30) Foreign Application Priority Data

Nov. 20, 2023 (DE) ........................ 102023132269.9

(51) Int. Cl.

*F04D 29/40* (2006.01)
*F04B 1/145* (2020.01)
*F04D 13/06* (2006.01)
*H02K 5/04* (2006.01)

(52) U.S. Cl.

CPC ........... *F04D 29/406* (2013.01); *F04B 1/145* (2013.01); *F04D 13/06* (2013.01); *H02K 5/04* (2013.01)

(58) Field of Classification Search

CPC ...... F04B 1/145; F04D 29/406; F04D 29/528; H02K 5/04

See application file for complete search history.

(56) References Cited

U.S. PATENT DOCUMENTS

2017/0302126 A1* 10/2017 Ehrsam .................... H02K 5/22

FOREIGN PATENT DOCUMENTS

| | | | | |
|---|---|---|---|---|
| CN | 112524048 A * | 3/2021 | .......... | F04D 29/426 |
| DE | 10 2009 047 332 A1 | 6/2011 | | |
| DE | 102010029978 A1 * | 12/2011 | .......... | F04D 29/628 |
| DE | 10 2016 206 397 A1 | 10/2017 | | |
| DE | 10 2016 206 404 A1 | 10/2017 | | |
| DE | 102019214301 A1 * | 4/2021 | .......... | H02K 1/2791 |
| DE | 11 2020 004 457 T5 | 8/2022 | | |

OTHER PUBLICATIONS

Machine translation of DE 102009047332 A1, accessed Dec. 16, 2025. (Year: 2025).*

German Search Report issued Oct. 15, 2024 in German Application 102023132269.9 filed on Nov. 20, 2023, 8 pages (with English Translation of Categories of Cited Documents & Written Opinion).

* cited by examiner

*Primary Examiner* — Jonathan R Matthias

(74) *Attorney, Agent, or Firm* — Oblon, McClelland, Maier & Neustadt, L.L.P.

(57) ABSTRACT

A hydraulic pump includes a motor housing and a stator module arranged within the motor housing. The stator module has a support which is received in a retaining portion of the motor housing. In this case, the retaining portion has first wall portions with a first wall thickness and second wall portions with a second wall thickness, wherein the second wall thickness is less than the first wall thickness. Here, the second wall portions are connected materially to the support of the stator module by means of a welded joint.

20 Claims, 3 Drawing Sheets

HYDRAULIC PUMP

BACKGROUND OF THE INVENTION

Field of the Invention

The invention relates to a hydraulic pump comprising a motor housing and a stator module, which is arranged within the motor housing.

Description of the Related Art

Hydraulic pumps of this kind are known.

Owing to the compact construction of conventional hydraulic pumps, the motor housing has only a very limited installation space for the stator module.

One challenge with known hydraulic pumps is to secure the stator module without play within the motor housing in order to ensure reliable operation of the hydraulic pump. Hitherto, a complex construction and laborious assembly of the hydraulic pump have been required for this purpose.

BRIEF SUMMARY OF THE INVENTION

It is the object of the invention to provide a hydraulic pump in which the stator module is secured within the housing with little effort.

The object is achieved by a hydraulic pump comprising a motor housing and a stator module, which is arranged within the motor housing. The stator module has a support which is received in a retaining portion of the motor housing. In this case, the retaining portion has first wall portions with a first wall thickness and second wall portions with a second wall thickness, wherein the second wall thickness is less than the first wall thickness. Furthermore, the second wall portions are connected materially to the support of the stator module by means of a welded joint.

According to the invention, it has been recognized that, with little effort, the support can be welded and thus reliably connected to the retaining portion via the second wall portions with a reduced wall thickness relative to the first wall portions. In particular, the welding can be performed radially from the outside through the or by means of the second wall portions, and therefore there is no need for open access to the stator module to secure the latter within the motor housing.

In particular, the second wall portions form weakened regions in the housing wall of the motor housing, while the first wall portions correspond to the conventional housing wall. In other words, the first wall portions do not merely form particularly reinforced wall portions of the motor housing, like wall portions with ribs or studs, which, if present at all, are generally provided only in relatively limited regions on the motor housing.

In one embodiment, the second wall portions are formed from a laser-transparent plastic. In particular, the second wall portions are in this case laser-welded to the support. In this way, the motor housing can be welded radially from the outside to the stator module in a particularly efficient way.

Here, the second wall thickness can be a maximum of 2 mm, and therefore the heat input during welding quickly reaches a depth which ensures an effective welded joint between the retaining portion and the support. If the welded joint is formed by a laser welding method, the second wall portion is sufficiently thin in the case of such a wall thickness, and therefore a sufficiently large proportion of the laser power passes through the second wall portion to ensure an effective welded joint.

In addition or as an alternative, the first wall thickness can be at least 3.6 mm, thus ensuring that the motor housing has a sufficiently high structural strength and thus provides a high protective effect.

In another embodiment, the retaining portion has at least four first wall portions and at least four second wall portions. As a result, the retaining portion is welded to the stator module at several locations and thus connected in a particularly reliable manner.

Moreover, provision can be made for the first wall portions and the second wall portions to be arranged on a common circumference or one circumferential line. In other words, the first wall portions and the second wall portions are arranged in series in the circumferential direction. In this way, the second wall portions, at which the motor housing is weakened and connected materially to the support, are distributed over the outer circumference of the retaining portion, thus enabling the motor housing and the hydraulic pump overall to be configured in a particularly stable way.

In addition or as an alternative, mutually adjacent second wall portions can each be separated from one another in the circumferential direction by at least one first wall portion in order to ensure a particularly high strength of the motor housing despite the thinner second wall portions.

According to one embodiment, the second wall portions each extend over at least 5 mm in the circumferential direction, in particular over at least 10 mm. As a result, the second wall portions are wide enough to enable an effective welded joint to be produced with little effort.

According to another embodiment, the second wall portions are welded to an axial end of the support which faces a pump module of the hydraulic pump. In this way, the motor housing is welded to the stator module at a location which is normally no longer accessible after the stator module is arranged within the motor housing. Thus, there are fewer requirements on the configuration of the hydraulic pump, enabling it to have a less complex construction.

Furthermore, at least some of the first wall portions can be arranged at the same angular positions as connecting portions of a pump housing of the hydraulic pump at which a pump module of the hydraulic pump is secured. This has the advantage that the first wall portions, which are thicker in comparison with the second wall portions, are in alignment in the axial direction with the connecting portions, which are of particularly stable configuration like the first wall portions. The hydraulic pump can thus have a particularly high strength.

Moreover, provision can be made for the motor housing to be formed in one piece with a pump housing of the hydraulic pump in which a pump module of the hydraulic pump is accommodated. This enables the hydraulic pump to consist of a particularly small number of individual parts and thus to be configured in a particularly efficient way.

BRIEF DESCRIPTION OF THE SEVERAL VIEWS OF THE DRAWINGS

Further advantages and features will become apparent from the following description and from the appended drawings. In said drawings.

DETAILED DESCRIPTION OF THE INVENTION

The detailed description below in combination with the appended drawings, in which the same numerals refer to identical elements, is intended as a description of various embodiments of the disclosed subject matter, and is not supposed to represent the individual embodiments. Each embodiment described in this disclosure is used purely as an example or illustration and should not be interpreted as preferred or advantageous relative to other embodiments.

All the features disclosed below with reference to the exemplary embodiments and/or the accompanying figures can be combined singly or in any desired subcombination with features of the aspects of the present disclosure, including features of preferred embodiments, provided that the resulting combination of features is worthwhile for a person skilled in the art.

Figure 1:
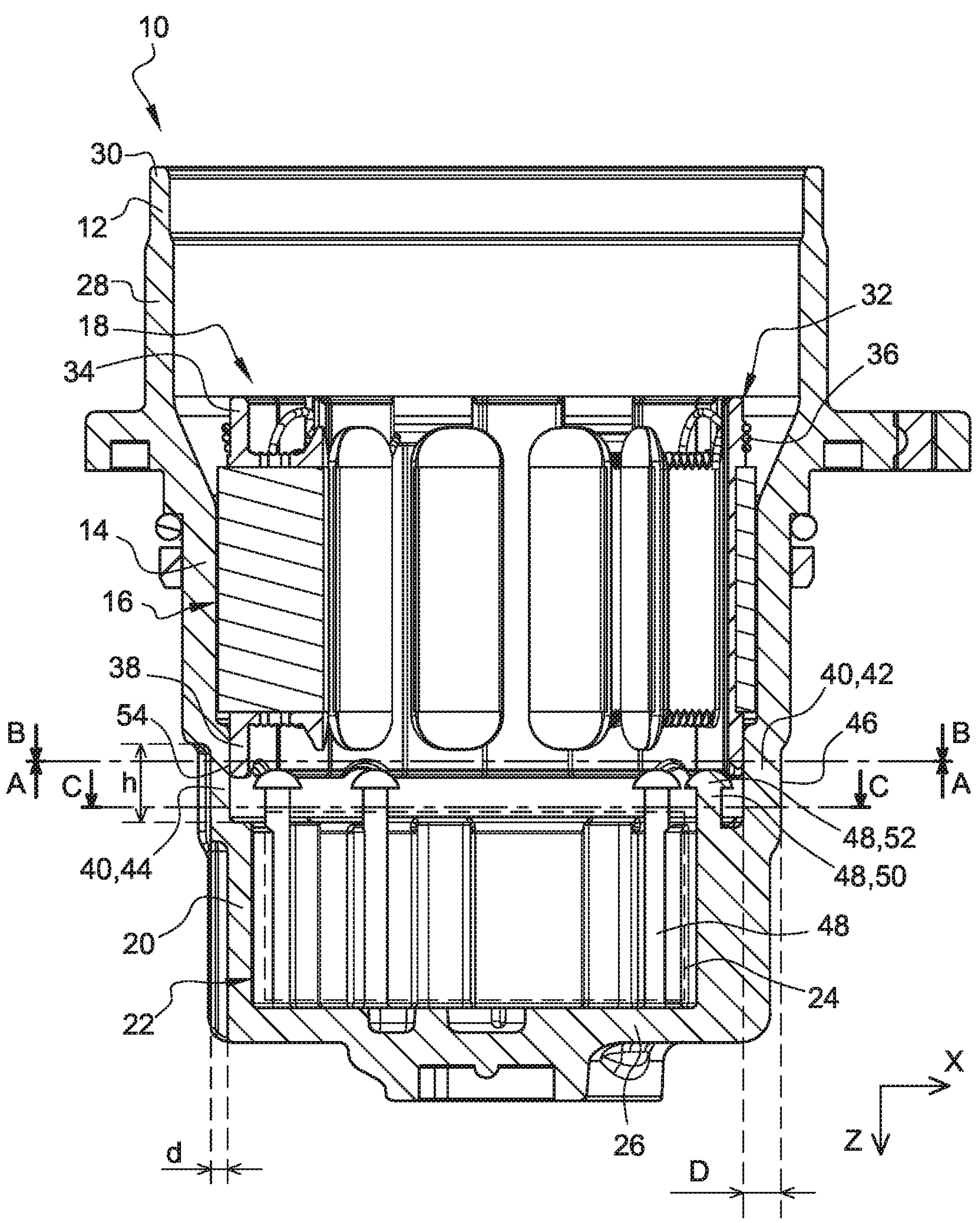
FIG. 1 shows a hydraulic pump according to the invention comprising a stator module and a pump module in an axial sectional view.

FIG. 1 shows a hydraulic pump 10, wherein only the parts essential to the invention are illustrated for the sake of greater clarity. In particular, illustration of a rotor of the electric motor 18 and of electronics for controlling the hydraulic pump 10 has been omitted.

The hydraulic pump 10 is configured, for example, to provide a hydraulic oil flow for a drive train of a motor vehicle. The said hydraulic oil flow can be used to lubricate or cool parts of the drive train. The hydraulic oil flow can also be provided for conversion, in actuators, into an actuating stroke, for example in order to shift a clutch.

The hydraulic pump 10 has a housing 12 with a motor housing 14, in the interior 16 of which an electric motor 18 (illustrated only in part) is arranged, and a pump housing 20, in the interior 22 of which a pump module 24 is accommodated.

Here, the housing 12 is of a one-piece construction and has a pot shape, i.e. a bottom 26 and a side wall 28, which extends substantially in the shape of a hollow cylinder counter to an axial direction Z from the bottom 26 to a housing edge 30.

In an alternative embodiment, the housing 12 consists of a plurality of individual parts.

In addition to the rotor (not illustrated), the electric motor 18 has a stator module 32 with a support 34 and a stator winding 36.

The support 34 consists of plastic and here forms a slot insulator, on which the stator winding 36 is mounted.

In this context, the stator module 32 is arranged in a stationary manner in the housing 12, and the rotor is connected in terms of drive, via a shaft (not illustrated), to the pump module 24, in particular to a pump rotor of the pump module 24.

At its end 38 facing the pump module 24, the support 34 is secured on a retaining portion 40 of the motor housing 14.

Figure 2:
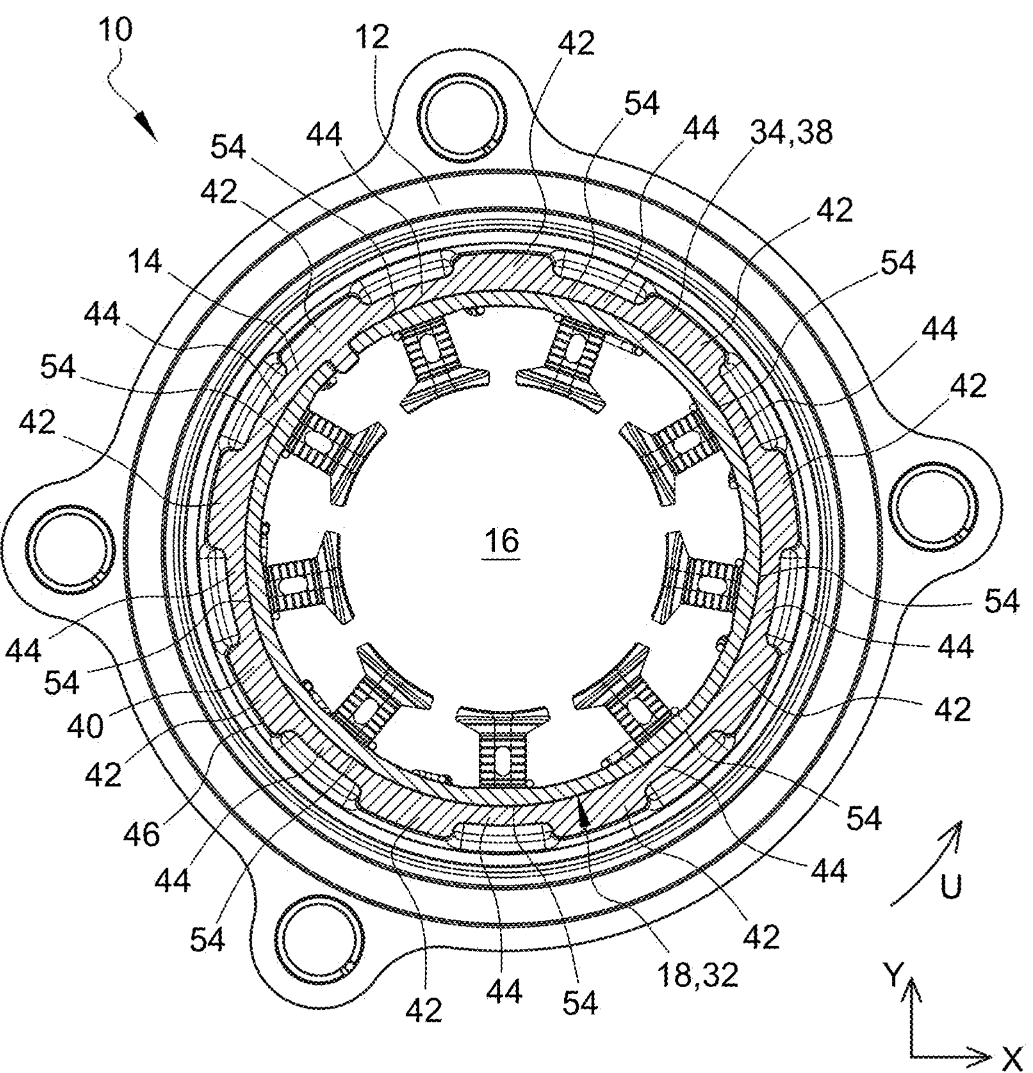
FIG. 2 shows the hydraulic pump in a sectional view along the plane A-A in FIG. 1, wherein a stator winding of the stator module is not illustrated.

The retaining portion 40 extends in a ring shape or in a closed form around the support 34 in the circumferential direction U (see FIG. 2) and adjoins the latter radially over an extended area on the inside.

In the embodiment under consideration, the retaining portion 40 has nine first wall portions 42 and nine second wall portions 44, which are arranged alternately in series in the circumferential direction U on a common circumference 46 of the retaining portion 40.

In an alternative embodiment, the retaining portion 40 can have any desired number of first wall portions 42 and any desired number of second wall portions 44, but preferably at least four first wall portions 42 and at least four second wall portions 44.

In addition or as an alternative, the first wall portions 42 and the second wall portions 44 can be arranged in any desired sequence in the circumferential direction U. In particular, however, in each case at least one first wall portion 42 is arranged between two mutually adjacent second wall portions 44.

Figures 3, 4:
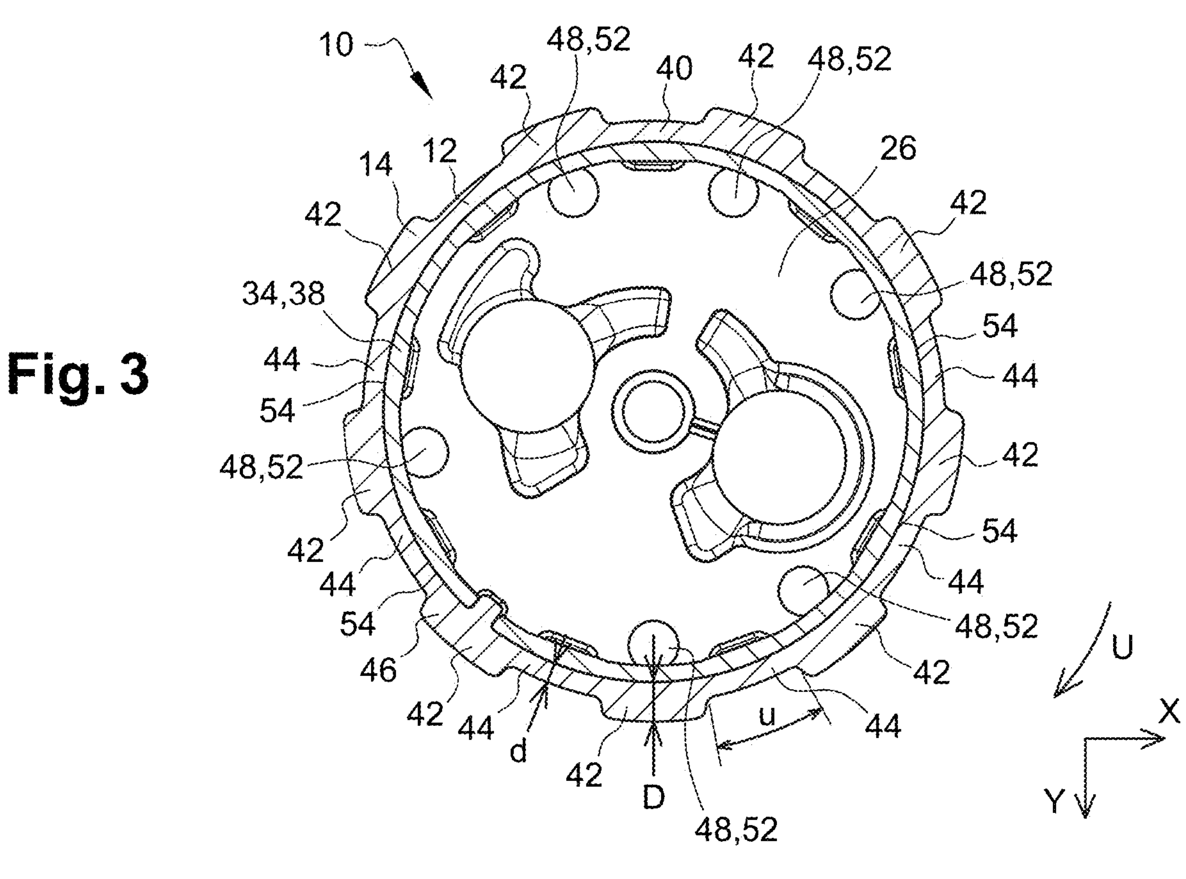
FIG. 3 shows the hydraulic pump in a sectional view along the plane B-B in FIG. 1, wherein the pump module is not illustrated.
FIG. 4 shows the hydraulic pump in a sectional view along the plane C-C in FIG. 1, wherein the pump module is not illustrated.

The first wall portions 42 have a first wall thickness D (see FIG. 3) of 4 mm, while the second wall portions 44 have a second wall thickness d of 1.8 mm.

In general, the first wall thickness D and the second wall thickness d can each be of arbitrary size.

The first wall thickness D is preferably at least 3.6 mm, while the second wall thickness d is a maximum of 2 mm.

In all embodiments, the first wall thickness D is greater than the second wall thickness d.

The second wall portions 44 have a width u of 30 mm in the circumferential direction U and a height h (see FIG. 1) of 20 mm in the axial direction Z.

In an alternative embodiment, the second wall portions 44 can each have any desired width u and any desired height h.

Preferably, the width u is at least 5 mm, in particular at least 10 mm.

Moreover, the height h is preferably at least 5 mm, in particular at least 10 mm.

In the embodiment under consideration, six of the nine first wall portions 42 are arranged at the same angular positions in the circumferential direction U as connecting portions 48 (see FIG. 4) of the pump housing 20, by means of which the pump module 24 is mounted on the pump housing 20.

This means that each connecting portion 48 is assigned a first wall portion 42 at the same angular position as the corresponding connecting portion 48.

In an alternative embodiment, it is of course possible to arrange any desired fraction of the first wall portions 42 at the angular positions of the connecting portions 48.

Here, the connecting portions 48 each have a cylindrical retaining pin 50, which extends in the axial direction Z and ends in a mushroom-shaped retaining protrusion 52.

By means of the retaining protrusion 52, the pump module 24 is fixed in the axial direction Z in the interior 22 of the pump housing 20.

In principle, the connecting portions 48 can each be configured as desired.

In all embodiments, the support 34 is connected materially to the second wall portions 44, in each case by means of a welded joint 54.

In particular, the support 34 is laser-welded to the second wall portions 44.

For this purpose, the housing 12 is formed from a laser-transparent plastic, which has a glass fibre content of at least 40%, particularly in the second wall portions 44.

The housing 12 is an injection-moulded part, for example.

In principle, the housing 12 can be formed from any desired material as long as the motor housing 14 or at least the second wall portions 44 are formed from a laser-transparent plastic that ensures effective formation of the welded joint 54.

In the embodiment under consideration, the first wall portions 42 are not connected to the support 34 by means of a welded joint 54.

In particular, the motor housing 14 is not connected materially to the support 34 via the first wall portions 42 but only via the second wall portions 44.

To assemble the hydraulic pump 10, the pump module 24 is first of all inserted into the pump housing 20 in the axial direction Z and secured in the interior 22 by means of the connecting portions 48.

For this purpose, the retaining pins 50 are plastically deformed to form the retaining protrusions 52 after the insertion of the pump module 24.

The stator model 32 is then inserted into the interior 16 of the motor housing 14 in the axial direction Z.

In a subsequent step, the stator module 32 is secured on the motor housing 14 by welding, in particular spot-welding, the retaining portion 40 to the support 34 radially from the outside via the second wall portions 44 by means of a laser. This means that, during the welding process, the laser penetrates from the outside, through the respective second wall portion 44, into that portion of the support 34 which is arranged adjacent to the corresponding second wall portion 44 radially on the inside.

The formation of the welded joints 54 does not have to take place immediately after the insertion of the stator module 32 but can take place at any subsequent point in time.

In one embodiment, for example, the stator module 32 may be welded to the motor housing 14 only after all parts or assemblies have been inserted into the housing 12, in particular after the housing 12 has been closed with a cover.

In this way, a hydraulic pump 10 is provided which can be produced at low cost.

In this case, the stator module 32 is secured quickly and reliably in the interior 16 of the motor housing 14, in particular at the end 38 of the support 34 which faces the pump module 24.

The invention claimed is:

1. A hydraulic pump comprising:

a motor housing and a stator module, which is arranged within the motor housing, wherein the stator module has a support which is received in a retaining portion of the motor housing, wherein the retaining portion has first wall portions with a first wall thickness and second wall portions with a second wall thickness at a given axial location of the retaining portion, wherein the second wall thickness is less than the first wall thickness, and wherein the second wall portions are connected materially to the support of the stator module by a welded joint at the given axial location of the retaining portion.

2. The hydraulic pump according to claim 1, wherein the second wall portions are formed from a laser-transparent plastic, and wherein the second wall portions are laser-welded to the support.

3. The hydraulic pump according to claim 2, wherein the second wall thickness is a maximum of 2 mm, and wherein the first wall thickness is at least 3.6 mm.

4. The hydraulic pump according to claim 2, wherein the retaining portion has at least four first wall portions and at least four second wall portions.

5. The hydraulic pump according to claim 2, wherein the first wall portions and the second wall portions are arranged on a common circumference.

6. The hydraulic pump according to claim 2, wherein mutually adjacent second wall portions are each separated from one another in a circumferential direction by at least one first wall portion.

7. The hydraulic pump according to claim 2, wherein the second wall portions each extend over at least 5 mm in a circumferential direction.

8. The hydraulic pump according to claim 2, wherein the second wall portions are welded to an axial end of the support which faces a pump module of the hydraulic pump.

9. The hydraulic pump according to claim 2, wherein at least some of the first wall portions are arranged at the same angular positions as connecting portions of a pump housing of the hydraulic pump at which a pump module of the hydraulic pump is secured.

10. The hydraulic pump according to claim 2, wherein the motor housing is formed in one piece with a pump housing of the hydraulic pump in which a pump module of the hydraulic pump is accommodated.

11. The hydraulic pump according to claim 1, wherein the second wall thickness is a maximum of 2 mm, and wherein the first wall thickness is at least 3.6 mm.

12. The hydraulic pump according to claim 11, wherein the retaining portion has at least four first wall portions and at least four second wall portions.

13. The hydraulic pump according to claim 11, wherein the first wall portions and the second wall portions are arranged on a common circumference.

14. The hydraulic pump according to claim 1, wherein the retaining portion has at least four first wall portions and at least four second wall portions.

15. The hydraulic pump according to claim 1, wherein the first wall portions and the second wall portions are arranged on a common circumference.

16. The hydraulic pump according to claim 1, wherein mutually adjacent second wall portions are each separated from one another in a circumferential direction by at least one first wall portion.

17. The hydraulic pump according to claim 1, wherein the second wall portions each extend over at least 5 mm in a circumferential direction.

18. The hydraulic pump according to claim 1, wherein the second wall portions are welded to an axial end of the support which faces a pump module of the hydraulic pump.

19. The hydraulic pump according to claim 1, wherein at least some of the first wall portions are arranged at same angular positions as connecting portions of a pump housing of the hydraulic pump at which a pump module of the hydraulic pump is secured.

20. The hydraulic pump according to claim 1, wherein the motor housing is formed in one piece with a pump housing of the hydraulic pump in which a pump module of the hydraulic pump is accommodated.

* * * * *